(12) United States Patent
Chao (10) Patent No.: US 11,633,069 B2
(45) Date of Patent: Apr. 25, 2023

(54) EASILY MODIFIED BATHING CHAIR

(71) Applicant: Andy Chao, Orange, CA (US)

(72) Inventor: Andy Chao, Orange, CA (US)

( * ) Notice: Subject to any disclaimer, the term of this patent is extended or adjusted under 35 U.S.C. 154(b) by 205 days.

(21) Appl. No.: 17/116,218

(22) Filed: Dec. 9, 2020

(65) Prior Publication Data
US 2022/0175195 A1 Jun. 9, 2022

(51) Int. Cl.
*A47K 3/12* (2006.01)
*F16B 7/04* (2006.01)

(52) U.S. Cl.
CPC ............ *A47K 3/122* (2013.01); *F16B 7/0493* (2013.01)

(58) Field of Classification Search
CPC .......... A47K 3/122; A47K 3/282; A47C 3/34; A61G 7/1003
USPC .............................................. 297/344.11, 130
See application file for complete search history.

(56) References Cited

U.S. PATENT DOCUMENTS

| | | | |
|---|---|---|---|
| 7,661,154 B2 * | 2/2010 | Cheng | A47K 3/122 4/578.1 |
| 10,722,033 B1 * | 7/2020 | Chen | A47C 3/18 |
| 10,813,505 B2 * | 10/2020 | Lin | A61G 7/1003 |
| 2017/0172353 A1 * | 6/2017 | Chao | A47K 3/122 |

\* cited by examiner

*Primary Examiner* — Sarah B McPartlin
(74) *Attorney, Agent, or Firm* — Ian B. Oglesby (57) ABSTRACT

An easily modified bathing chair comprises: two side connecting pedestals, having a beam, two beam tubes and two leg tubes respectively; four legs which are fixed in the leg tubes of the two side connecting pedestals, respectively; a seat, having two front slides and two rear slides on a bottom thereof, wherein the two front slides each have a first seat positioning structure; and a long upper beam set and a short upper beam set, wherein either the long upper beam set or the short upper beam set is slidingly mounted on the seat and set between the beam tubes of the two side connecting pedestals, thereby it is achieved that a bathing chair of any of two types is assembled conveniently.

1 Claim, 10 Drawing Sheets

EASILY MODIFIED BATHING CHAIR

FIELD OF THE INVENTION

The present invention relates to an easily modified bathing chair; particularly to an easily modified bathing chair, which is readily assembled as any of two types of bathing chairs.

BACKGROUND OF THE INVENTION

A bathing chair is a nursing tool which can assist users, such as elderly and disabled persons to bathe lower body parts. Depending on whether the seat of a bathing chair is movable, the bathing chair is alternatively set up as a fixed bathing chair and a sliding bathing chair. A sliding bathing chair can span the inside and outside of a bathtub. There are conventional patents related to a sliding bathing chair, such as "a multifunctional chair" disclosed by R.O.C. Patent M584133, "A positioning system for seat of a bathing chair" disclosed by R.O.C. Patent I573543 and U.S. patent Ser. No. 09/895,029B2, as well as "Bathing chair with fixing device" disclosed by R.O.C. Patent M309962 and U.S. patent Ser. No. 07/451,501B2; wherein it can effectively help users get in and out of the bathtub. Hence such bathing chairs are very popular with users. However, spanning the inside and outside of a bathtub causes an extended width of a sliding bathing chair. With different requirements, users need to purchase a fixed bathing chair separately. For the user it is not only extra burden, but also inconvenient for storing.

In view of these disadvantages the inventor tried the continuous testing and improvement and developed the present invention,

SUMMARY OF THE INVENTION

The main object of the present invention is to provide an easily modified bathing chair which is readily assembled as any of two types of bathing chairs.

For achieving above object, the present invention comprises: two side connecting pedestals, having a beam, two beam tubes and two leg tubes respectively; four legs, which are fixed in the leg tubes of the two side connecting pedestals, respectively; a seat, having two front slides and two rear slides on a bottom thereof, wherein the two front slides each have a first seat positioning structure; and a long upper beam set and a short upper beam set, wherein either the long upper beam set or the short upper beam set is slidingly mounted on the seat and set between the beam tubes of the two side connecting pedestals, wherein the long upper beam set has a front long upper beam and a rear long upper beam, wherein each end of the front long upper beam has a second seat positioning structure; when the front long upper beam and the rear long upper beam of the long upper beam set are slidingly mounted with the two front slides and the two rear slides of the seat, and set between the beam tubes of the two side connecting pedestals, the seat is sliding; wherein the short upper beam set has two short upper beams, when the two short upper beams of the short upper beam set are slidingly connected with the two front slides and the two rear slides of the seat and set between the beam tubes of the two side connecting pedestals, the beam tubes of the two side connecting pedestals are leaning beyond the two front slides, whereby the seat is fixed and prevented from sliding.

Another object of the present invention is to provide an easily modified bathing chair, wherein it is modified into a sliding bathing chair conveniently.

For achieving above object, the present invention comprises: two side connecting pedestals, having a beam, two beam tubes and two leg tubes respectively; four legs, which are fixed in the leg tubes of the two side connecting pedestals, respectively; a seat, having two front slides and two rear slides on a bottom thereof, wherein the two front slides each have a first seat positioning structure; and a short upper beam set, which is slidingly mounted on the seat and set between the beam tubes of the two side connecting pedestals; wherein the short upper beam set has two short upper beams, when the two short upper beams of the two short upper beam set are slidingly mounted with the two front slides and the two rear slides and set between the beam tubes of the two side connecting pedestals, the beam tubes of the two side connecting pedestals lean beyond the two front slides, whereby the seat stays fixed and is prevented from sliding.

Other aspects and advantages of the present invention will become apparent from the following detailed description, taken in conjunction with the accompanying drawing, illustrating by way of example the principles of the present invention.

DESCRIPTION OF THE PREFERRED EMBODIMENTS

FIG. 1-11 show the first embodiment of the present invention. As shown in FIG. 1-11, the easily modified bathing chair 100 of the present invention comprises: two side connecting pedestals 1, having a beam 11, two beam tubes 12 and two leg tubes 13 respectively; four legs 2, which are fixed in the leg tubes 13 of the two side connecting pedestals 1, respectively; a seat 3, having two front slides 31 and two rear slides 32 on a bottom thereof, wherein the two front slides 31 each have a first seat positioning structure 311; and a long upper beam set 4 and a short upper beam set 5, wherein either the long upper beam set 4 or the short upper beam set 5 is slidingly mounted on the seat 3 and set between the beam tubes 12 of the two side connecting pedestals 1; wherein the long upper beam set 4 has a front long upper beam 41 and a rear long upper beam 42, wherein each end of the front long upper beam 41 has a second seat positioning structure 411; when the front long upper beam 41 and the rear long upper beam 42 of the long upper beam set 4 are slidingly mounted with the two front slides 31 and the two rear slides 32 of the seat 3, and set between the beam tubes 12 of the two side connecting pedestals 1, the seat 3 is sliding; wherein the short upper beam set 5 has two short upper beams 51; when the two short upper beams 51 of the short upper beam set 3 are mounted with the two front slides 31 and the two rear slides 32 of the seat 3, and set between the beam tubes 12 of the two side connecting pedestals 1, the beam tubes 12 of the two side connecting pedestals 1 lean beyond the two front slides 31, whereby the seat 3 stays fixed and is prevented from sliding; thereby it is achieved, that a bathing chair of any of two types is set up conveniently. This is explained in detail below.

Figure 1:
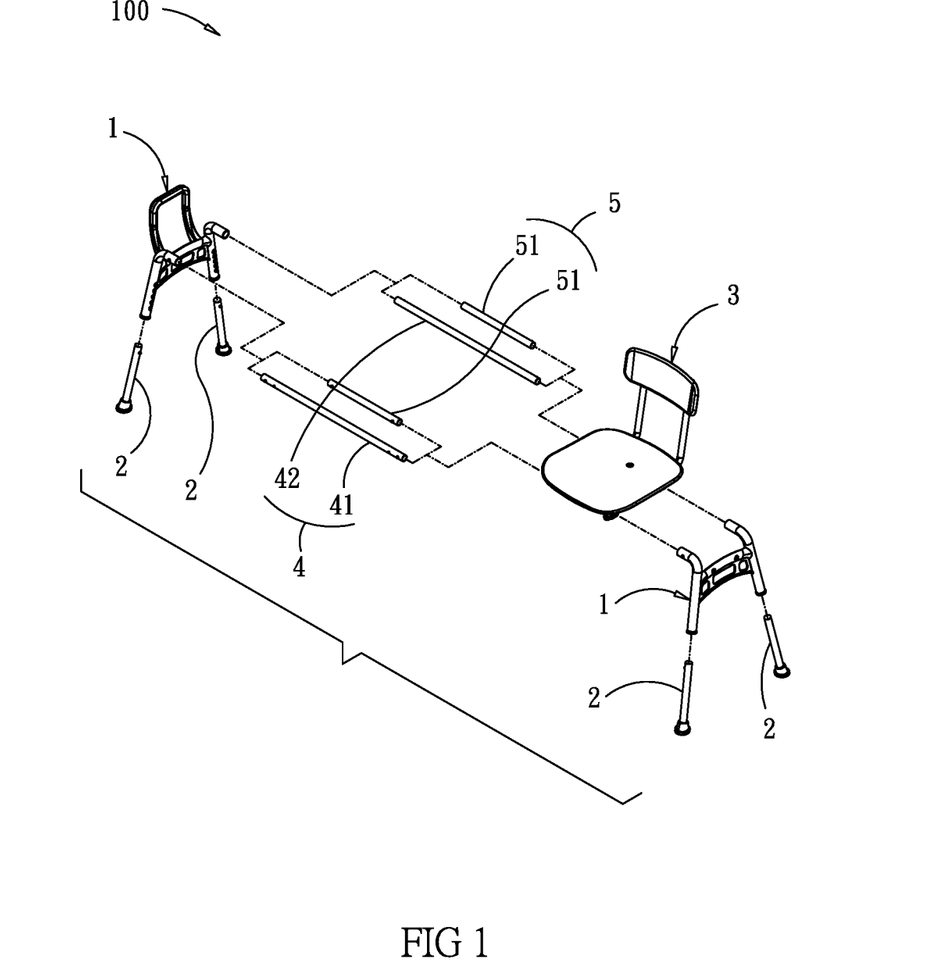
FIG. 1 shows an exploded view of the first embodiment of the present invention.
Figure 2:
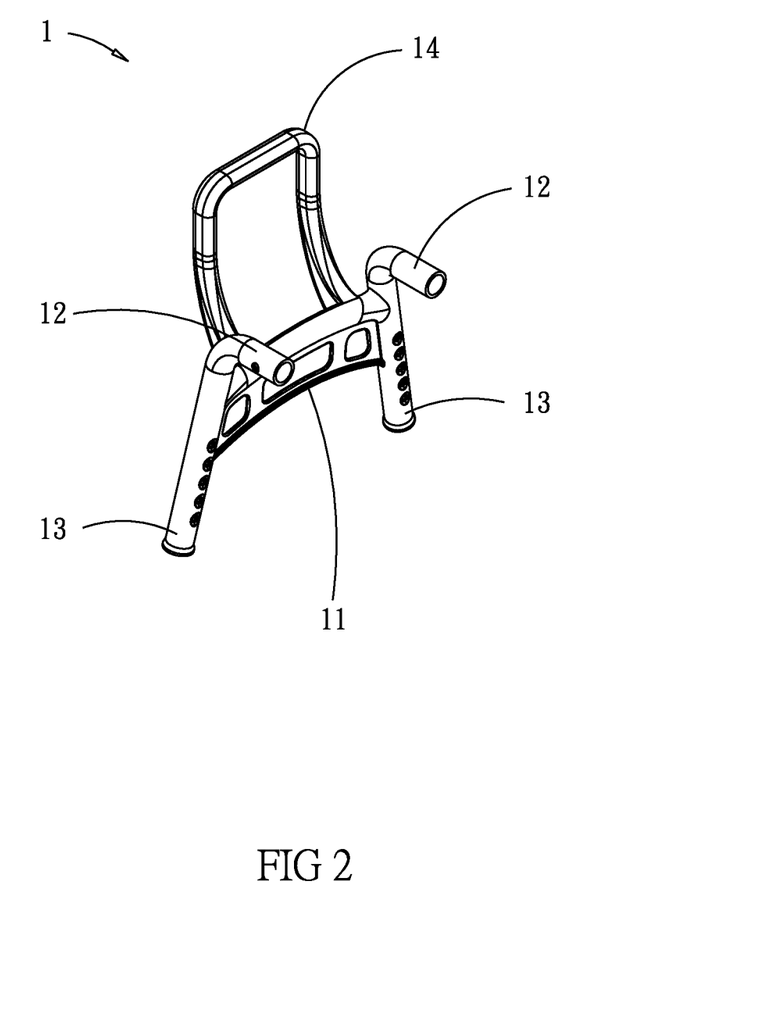
FIG. 2 shows a side connecting pedestal of the first embodiment of the present invention.

As shown in FIG. 1-2, the two side connecting pedestals 1 having a beam 11, two beam tubes 12 and two leg tubes 13 respectively, are used for connecting the legs 2, the seat 3 as well as the long upper beam set 4 and the short upper beam set 5. There are plural grips 14 set on the two side connecting pedestals 1 for holding. Besides, the two side connecting pedestals 1 are formed in one-piece, with such material as plastic, they can also be assembled by several tubes (not shown).

The legs 2 and the leg tubes 13 of the side connecting pedestals 1 are detachably assembled. Besides, the leg tubes 13 have predestinated lengths, wherein the leg tubes 2 are set adjustably in the leg tubes 13 for adjusting the height of the seat 3.

Figure 6:
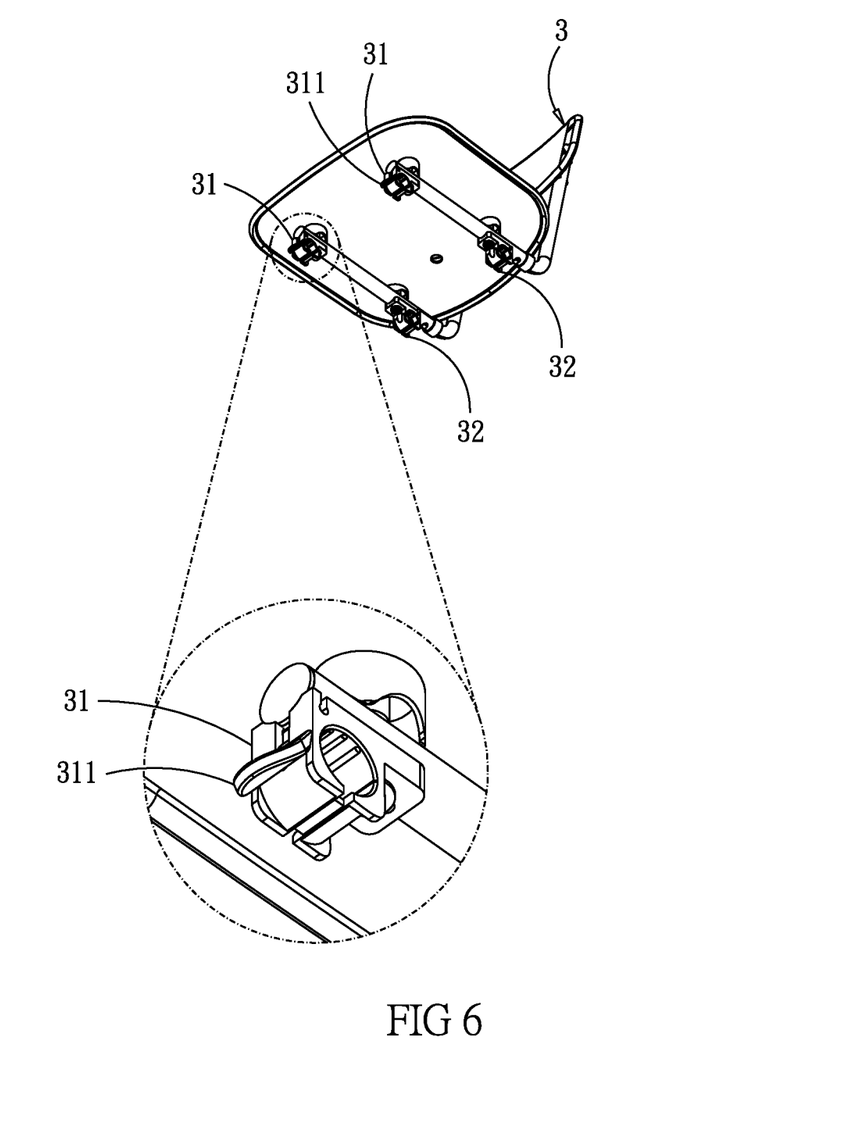
FIG. 6 shows the front slides of the first embodiment of the present invention.
Figure 9:
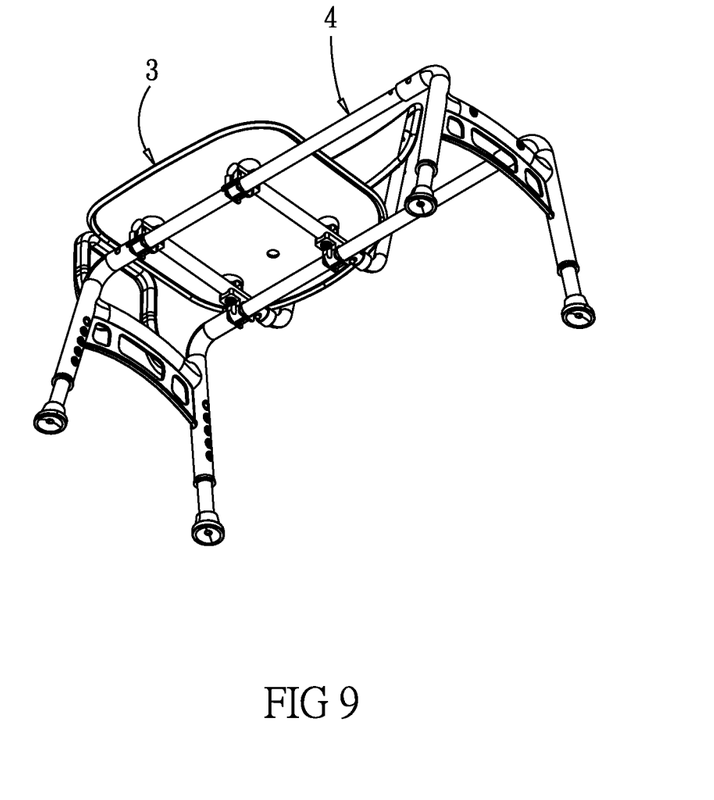
FIG. 9 shows the first embodiment of the present invention, wherein a first seat positioning structures of a seat is mounted with a second seat positioning structures of the front long upper beam.

The seat 3 is slidingly mounted with either the long upper beam set 4 or the short upper beam set 5. The seat 3 has two front slides 31 and two rear slides 32 on the bottom thereof, wherein the two front slides 31 each have a first seat positioning structure 311 (as shown in FIG. 6); thereby the seat 3 seat is fixed and prevented from sliding easily by requirement (as shown in FIG. 9).

Figure 8:
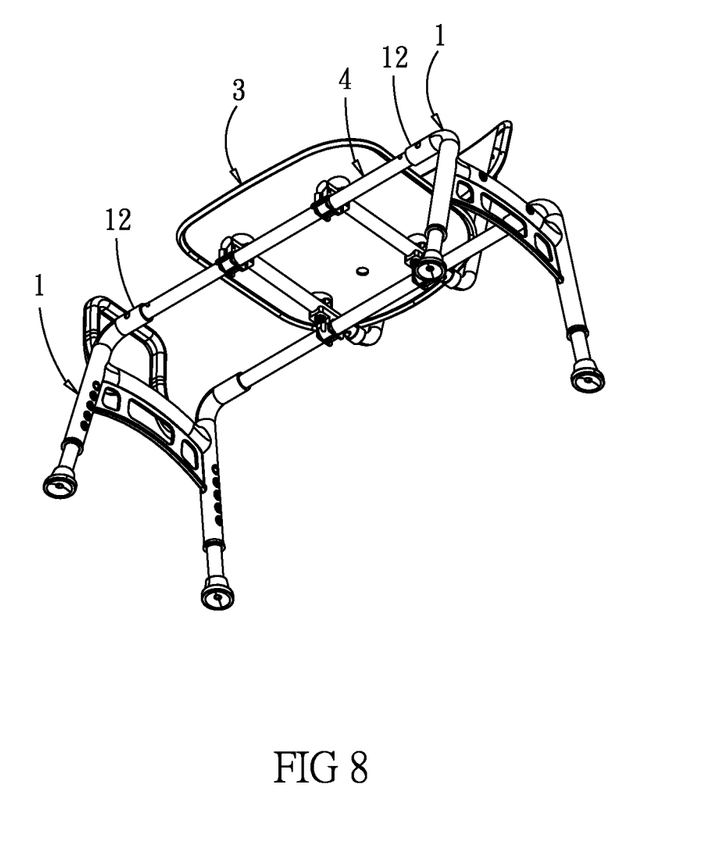
FIG. 8 shows the first embodiment of the present invention wherein the long upper beam set and a seat are assembled as a bathing chair of sliding type.
Figure 11:
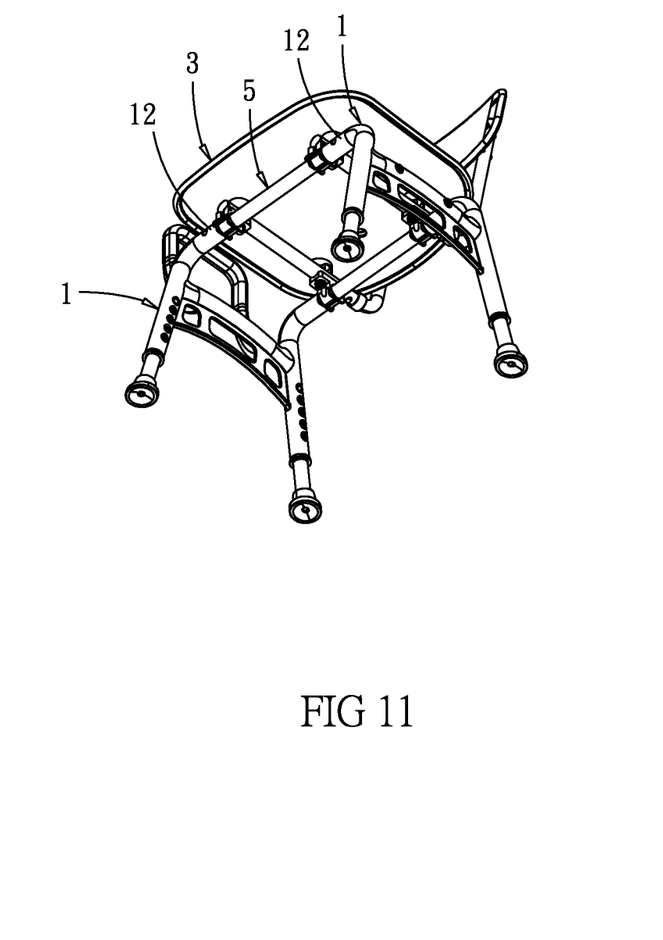
FIG. 11 shows the first embodiment of the present invention, wherein the short upper beam set and a seat are assembled as a bathing chair of fixed type.

The upper long beam set 4 and the short upper beam set 5 are mainly used for connecting the two side connecting pedestals 1 with the seat 3, wherein a bathing chair of sliding type (as shown in FIG. 8) as well as of fixed type (as shown in FIG. 11) is assembled, respectively, thereby it is achieved that a bathing chair of any of two types is assembled conveniently.

Figure 3:
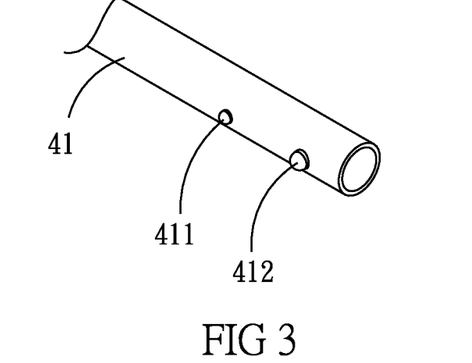
FIG. 3 shows a front long upper beam of the first embodiment of the present invention.
Figure 4:
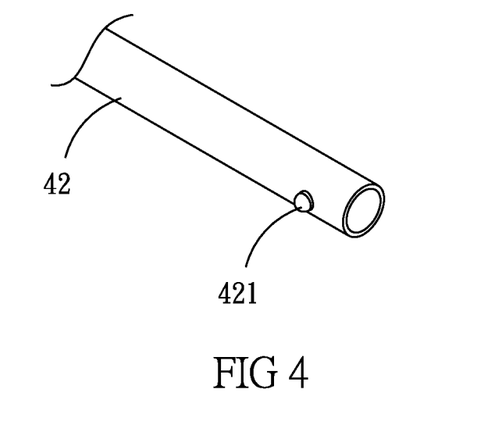
FIG. 4 shows a rear long upper beam of the first embodiment of the present invention.
Figure 5:
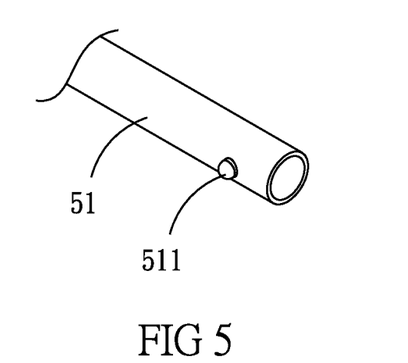
FIG. 5 shows a short upper beam of the first embodiment of the present invention.

As shown in FIG. 3-5, each ends of the front long upper beam 41 and the rear long upper beam 42 of the long upper beam set 4 as well as each ends of the two short upper beams 51 of the short upper beam set 5 have a beam fixing structure 412, 421 and 511, respectively, whereby the beam tubes 12 are slidingly mounted thereon.

Figure 7:
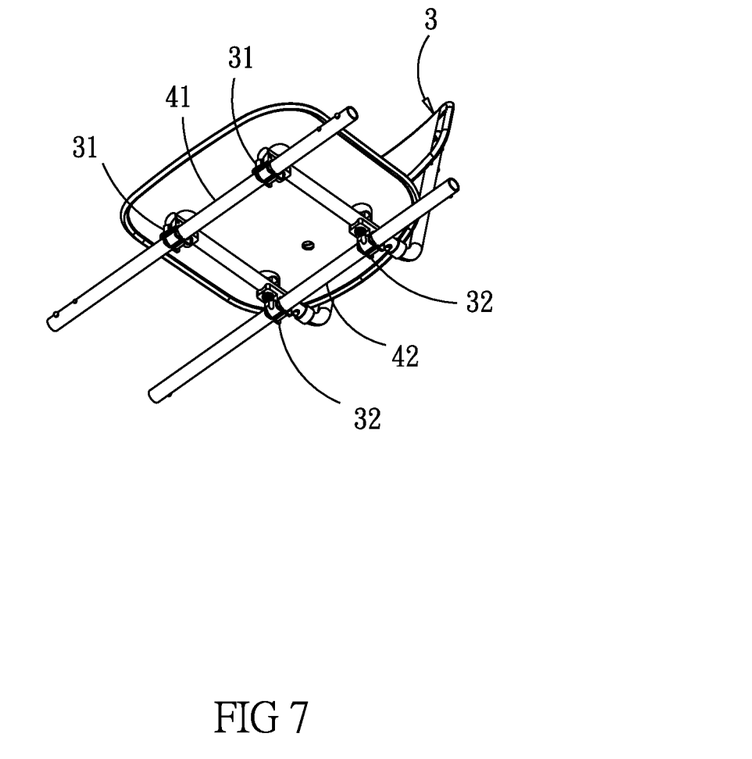
FIG. 7 shows a long upper beam set of the first embodiment of the present invention slidingly mounted with a seat.

As shown in FIGS. 3-4 and FIGS. 7-8, the long upper beam set has a front long upper beam 41 and a rear long upper beam 42, wherein each end of the front long upper beam 41 has a second seat positioning structure 411, when the front long upper beam 41 and the rear long upper beam 42 are slidingly mounted with the two front slides 31 and the two rear slides 32 (as shown in FIG. 7), and set with between the beam tubes 12 of the two side connecting pedestals 1 (as shown in FIG. 8), the seat 3 is sliding; thereby a bathing chair of sliding type is assembled conveniently.

As shown in FIG. 3, FIG. 6. and FIG. 9, when the seat 3 has been sliding to the predestinated position, the first seat positioning structures 311 of the seat 3 are fixed in the second seat positioning structures 411 of the front long beam 41 (as shown in FIG. 9), thereby the seat 3 seat is fixed and prevented from sliding.

Figure 10:
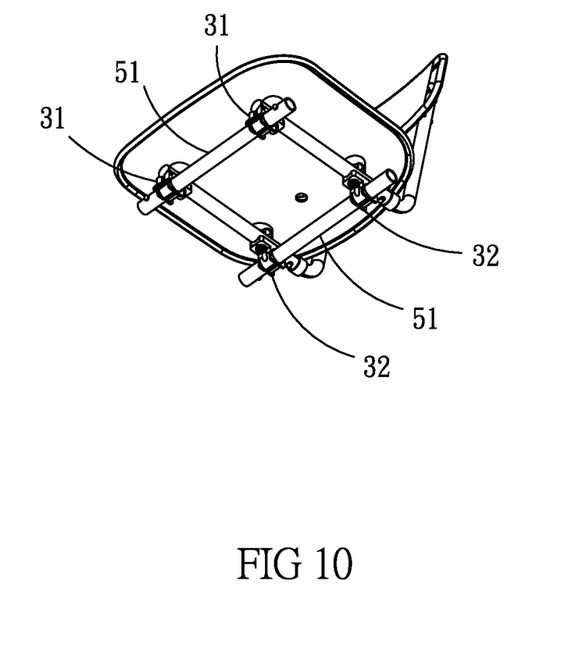
FIG. 10 shows the first embodiment of the present invention, wherein the short upper beam set is slidingly mounted with a seat.

As shown in FIG. 10-11, the short upper beam set 5 has two short upper beams 51, when the two short upper beams 51 are slidingly mounted with the two front slides 31 and the two rear slides 32 of the seat 3 (as shown in FIG. 10), and set between the beam tubes 12 of two side connecting pedestals 1 (as shown in FIG. 11), the two beam tubes 12 lean beyond the two front slides 31, thereafter the seat 3 is fixed and prevented from sliding; thereby a bathing chair of fixed type is assembled conveniently.

A bathing chair of the present invention is modified into either one of a sliding or a fixed type easily; moreover, either the short upper beam set 5 or the long upper beam set 4, which are substituted as required, takes little space, as compared to a conventional non-modifiable sliding bathing chair or a conventional fixed bathing chair, and so is convenient for storing. Besides, a bathing chair of fixed type assembled by the short upper beam set 5 as well as other members of the present invention is much more effective than a conventional bathing chair of either sliding or fixed type, as explained in the following. 1. Compared to a conventional fixed bathing chair, a bathing chair of fixed type of the present invention has the effect to be modified into a bathing chair of sliding type conveniently; a conventional fixed bathing chair mostly has an upper beam jointed or locked with a seat, but lacks the ability to be easily modified from a fixed bathing chair into a sliding bathing chair and back. Therefore a user needs to purchase both a fixed as well as a sliding bathing chair; to resolve this problem, the present invention discloses that the two short upper beams 51 of the short upper beam set 5 are slidingly mounted with the two front slides 31 and the two rear slides 32 of the seat 3, whereby the short upper beam set 5 and the seat 3 are divided conveniently, then the long upper beam set 4 is substituted and further more a bathing chair of sliding type is assembled, thus compared to a conventional fixed bathing chair, the present invention is effective to be modified from a bathing chair of fixed type into one of sliding type. 2. Compared to a conventional sliding bathing chair, a bathing chair of fixed type of the present invention is effective by saving cost; a seat of a conventional sliding bathing chair is slidingly mounted with an upper beam with low surface roughness for sliding smoothly; in this case, it is necessary to set a seat positioning structure on the upper beam, corresponding to the seat (e.g. the first positioning structure 311 of the present invention as shown in FIG. 3, FIG. 6), for fixing the seat as required easily, therefore it results a problem of increased cost; to resolve this problem, in the present invention the beam tubes 12 lean beyond the two slides 31 to fix the seat 3, whereby cost for positioning structures on the two short upper beams 51 corresponding to the seat is saved, therefore, compared to a conventional sliding bathing chair, the present invention is effective by saving cost.

Figure 12:
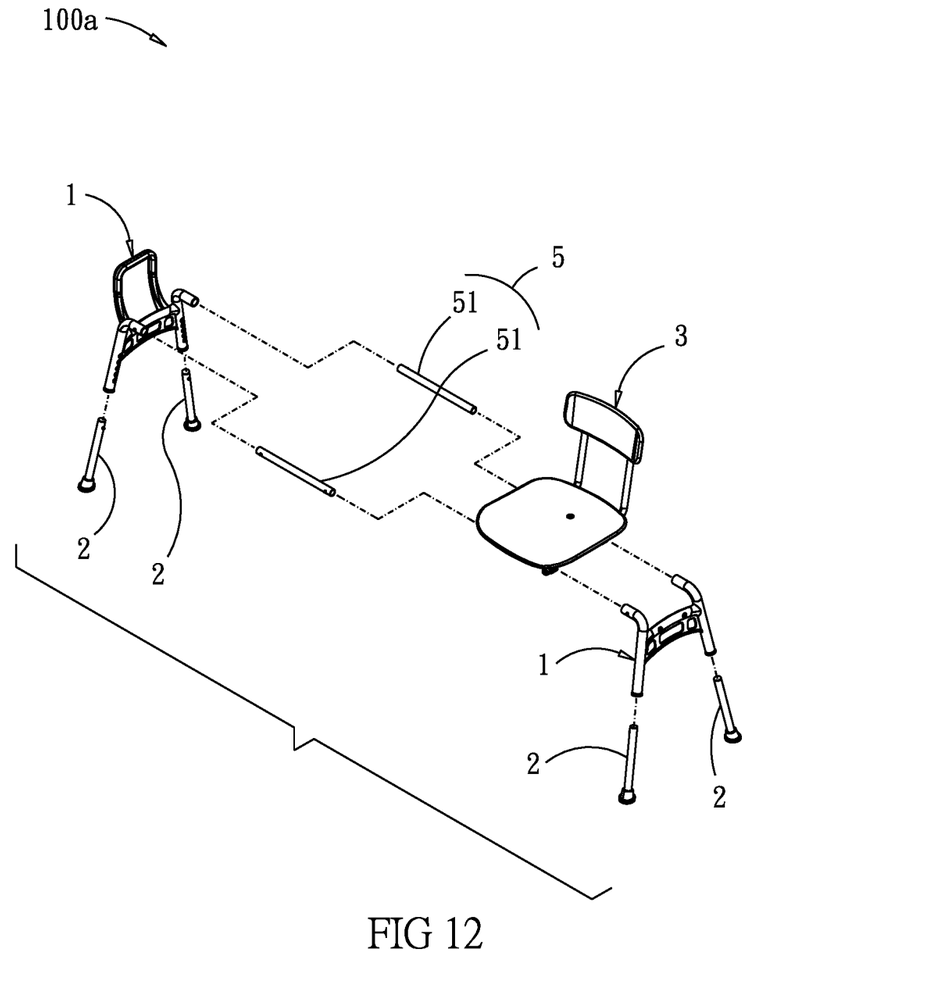
FIG. 12 shows an exploded view of the second embodiment of the present invention.

FIG. 12 shows the second embodiment of the present invention. As shown in FIG. 12, the second embodiment discloses an easily modified bathing chair 100a, compared to the first embodiment, the long upper beam set of the first embodiment is saved, thereby a sliding bathing chair is modified conveniently, as having the same effect as the bathing chair of fixed type of the first embodiment, a user can purchase a long upper beam set of other lengths.

While preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

The invention claimed is:

1. An easily modified bathing chair comprises:
   two side connecting pedestals, having a beam, two beam tubes and two leg tubes respectively;
   four legs which are fixed in the leg tubes of the two side connecting pedestals, respectively;
   a seat, having two front slides and two rear slides on a bottom thereof,
   wherein the two front slides each have a first seat positioning structure; and
   a long upper beam set and a short upper beam set,
   wherein either the long upper beam set or the short upper beam set is slidingly mounted on the seat and set between the beam tubes of the two side connecting pedestals;
   wherein the long upper beam set has a front long upper beam and a rear long upper beam;
   wherein each end of the front long upper beam has a second seat positioning structure;
   when the front long upper beam and the rear long upper beam of the long upper beam set are slidingly mounted with the two front slides and the two rear slides of the seat, and set between the beam tubes of the two side connecting pedestals, the seat is configured for sliding;
   wherein the short upper beam set has two short upper beams;
   when the two short upper beams of the short upper beam set are slidingly mounted with the two front slides and the two rear slides of the seat, and set between the beam tubes of the two side connecting pedestals, the beam tubes of the two side connecting pedestals extend beyond the two front slides, whereby the seat stays fixed and prevented from sliding.

* * * * *